US010209412B2

(12) United States Patent
Chan et al.

(10) Patent No.: US 10,209,412 B2
(45) Date of Patent: Feb. 19, 2019

(54) DISPLAY WITH MULTILAYER DIFFRACTIVE OPTICAL ELEMENTS

(71) Applicant: Facebook Technologies, LLC, Menlo Park, CA (US)

(72) Inventors: Ning Yeung Chan, Palo Alto, CA (US); Youngshik Yoon, Cupertino, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 14/968,805

(22) Filed: Dec. 14, 2015

(65) Prior Publication Data
US 2017/0168301 A1     Jun. 15, 2017

(51) Int. Cl.
*G02B 5/18*       (2006.01)
*G02B 27/01*      (2006.01)

(52) U.S. Cl.
CPC ........... *G02B 5/18* (2013.01); *G02B 27/0172* (2013.01); *G02B 2027/011* (2013.01); *G02B 2027/0107* (2013.01); *G02B 2027/0116* (2013.01); *G02B 2027/0125* (2013.01); *G02B 2027/0174* (2013.01); *G02B 2027/0187* (2013.01)

(58) Field of Classification Search
CPC .............. G02B 27/0172; G02B 5/1823; G02B 27/0025; G02B 27/4211; G02B 27/4277; G02B 1/105; G02B 1/01; G02B 5/18
USPC .................................................. 359/567, 618
See application file for complete search history.

(56) References Cited

U.S. PATENT DOCUMENTS

| 5,742,262 | A | * | 4/1998 | Tabata | G02B 27/0081 345/8 |
|---|---|---|---|---|---|
| 2002/0122259 | A1 | * | 9/2002 | Chen | G02B 27/0172 359/631 |
| 2009/0147362 | A1 | * | 6/2009 | Saito | G02B 5/1876 359/574 |
| 2009/0180186 | A1 | * | 7/2009 | Ando | B29C 39/025 359/566 |
| 2010/0134534 | A1 | * | 6/2010 | Seesselberg | G02B 6/0038 345/690 |
| 2014/0313584 | A1 | * | 10/2014 | Hanada | G02B 27/4205 359/571 |

* cited by examiner

*Primary Examiner* — Darryl J Collins
*Assistant Examiner* — Journey F Sumlar
(74) *Attorney, Agent, or Firm* — Fenwick & West LLP (57) ABSTRACT

The display headset for presenting an image to a user includes an electronic display and an optics block. The electronic display emits image light associated with the image toward an exit pupil corresponding to a location of an eye of the user. The optics block directs the image light from the electronic display to the exit pupil. The optics block includes a first diffractive optical element between the exit pupil and the electronic display, a second diffractive optical element between the first diffractive optical element and the exit pupil, a first protective layer on the first diffractive optical element to protect the first diffractive optical element, and a second protective layer on the second diffractive optical element to protect the second diffractive optical element. The first protective layer and the second protective layer compensate for a variation in a diffraction efficiency at different wavelengths and incident angles of the light.

15 Claims, 4 Drawing Sheets

DISPLAY WITH MULTILAYER DIFFRACTIVE OPTICAL ELEMENTS

BACKGROUND

The present disclosure generally relates to enhancing images from electronic displays, and specifically to an optical element to enhance transmission efficiency.

A display device is an interface between an electronic device and a person. A portable display device can be situated near eyes of a user in certain applications. For example, a display device in a form of goggles can be placed near eyes for immersive virtual reality experience or augmented reality experience. To present images with the display device located near the eyes, a diffractive optical element (DOE) may be placed between human eyes and the display device to enhance the diffraction efficiency over a wide field of view. However, the conventional DOE causes diffraction and scattering of light, hence a ghosting or a glare can occur. Moreover, the conventional DOE can cause optical aberrations such as chromatic aberration, spherical aberration, coma, astigmatism, field curvature and distortion of the optical system. Accordingly, the images presented to a user through the conventional DOE may be obscured.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

SUMMARY

Embodiments relates to a display headset for presenting an image to a user wearing the display headset. The display headset can be used to present an image of a virtual reality or an augmented reality.

In one embodiment, the display headset comprises an electronic display configured to emit image light toward an exit pupil corresponding to a location of an eye of a user; and an optics block configured to direct the image light from the electronic display to the exit pupil. The optics block includes a first diffractive optical element between the exit pupil and the electronic display, a second diffractive optical element between the first diffractive optical element and the exit pupil, a first protective layer on the first diffractive optical element to protect the first diffractive optical element, and a second protective layer on the second diffractive optical element to protect the second diffractive optical element. The first protective layer and the second protective layer compensate for a variation in a diffraction efficiency at different wavelengths and incident angles of the image light.

In one or more embodiments, the first protective layer and the second protective layer comprise resin. The first protective layer may be transparent in a wavelength range of a visual waveband, infrared waveband, or both.

In one or more embodiments, the first diffractive optical element comprises first ridges, and the second diffractive optical element comprises second ridges, each of the first ridges corresponding to a respective one of the second ridges. The first protective layer may comprise third ridges substantially similar to the second ridges, and the second protective layer may comprise fourth ridges substantially similar to the first ridges. In one aspect, a refractive index of the first protective layer and the second protective layer is between 1.4 and 1.72 or higher at a wavelength of 588 nm, wherein a refractive index of the first diffractive optical element is between 1.4 and 1.72 or higher at a wavelength of 588 nm, and wherein a refractive index of the second diffractive optical element is between 1.4 and 1.72 or higher at a wavelength of 588 nm.

In one or more embodiments, the first protective layer is formed on a surface of the first diffractive optical element facing the second diffractive optical element. The second protective layer may be formed on a surface of the second diffractive optical element facing the first diffractive optical element.

In one or more embodiment, the first protective layer and the second protective layer comprise a same material.

In one or more embodiments, the first diffractive optical element comprises a first plurality of ridges, and the second diffractive optical element comprises a second plurality of ridges. In one aspect, a first surface of the first diffractive optical element faces the electronic display; a second surface of the first diffractive optical element includes the first plurality of ridges toward the exit pupil; a third surface of the second diffractive optical element includes the second plurality of ridges toward the electronic display; and a fourth surface of the second diffractive optical element faces the exit pupil. The first plurality of ridges may be half convex ridges and the second plurality of ridges may be half concave ridges. The first protective layer may be formed on the second surface of the first diffractive optical element and the second protective layer may be formed on the third surface of the second diffractive optical element.

In one or more embodiments, the optics block further includes a lens coupled to the fourth surface of the second diffractive optical element. A surface of the lens disposed away from the fourth surface of the second diffractive optical element may be convex.

DETAILED DESCRIPTION

System Overview

Figure 1:
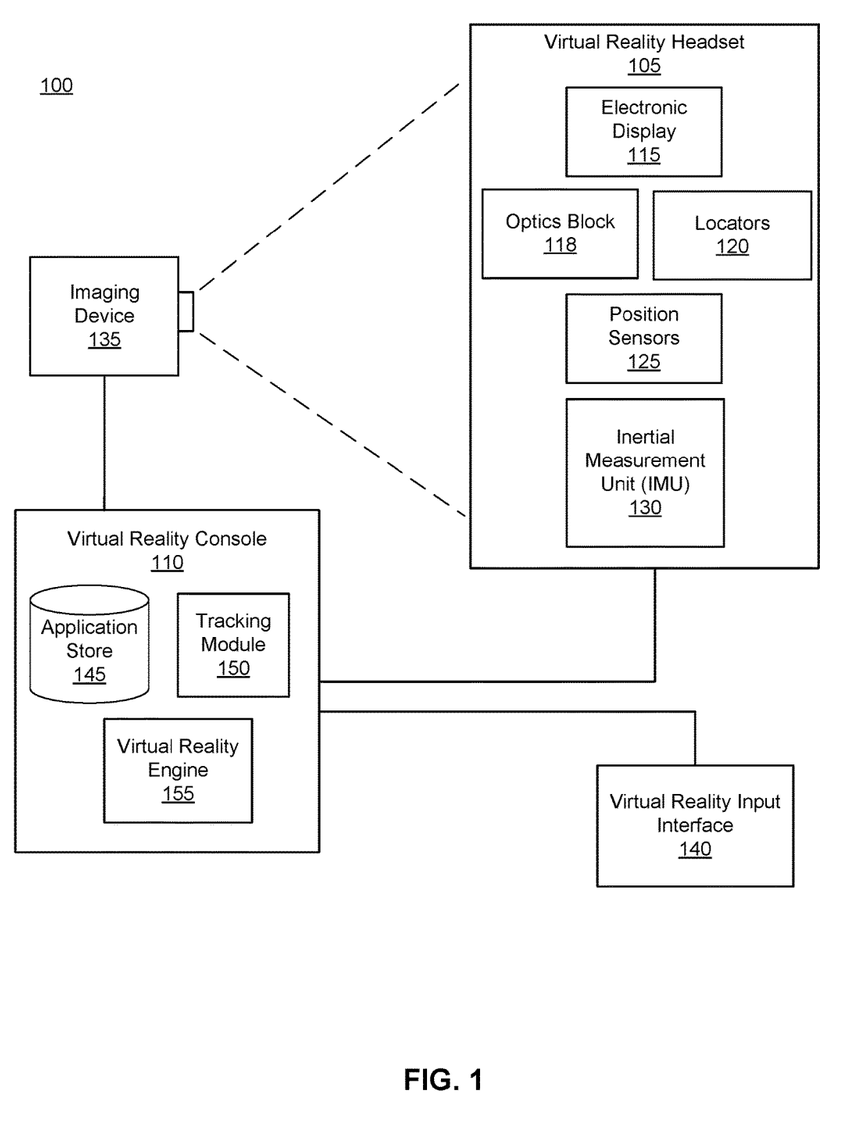
FIG. 1 is a block diagram of a system environment including a virtual reality system, in accordance with an embodiment.

FIG. 1 is a block diagram of a virtual reality (VR) system environment 100 in which a VR console 110 operates. The system environment 100 shown by FIG. 1 comprises a VR headset 105, an imaging device 135, and a VR input interface 140 that are each coupled to the VR console 110. While FIG. 1 shows an example system 100 including one VR headset 105, one imaging device 135, and one VR input interface 140, in other embodiments any number of these components may be included in the system 100. For example, there may be multiple VR headsets 105 each having an associated VR input interface 140 and being monitored by one or more imaging devices 135, with each VR headset 105, VR input interface 140, and imaging devices 135 communicating with the VR console 110. In alternative configurations, different and/or additional components may be included in the system environment 100.

The VR headset 105 is a head-mounted display that presents media to a user. Examples of media presented by the VR headset 105 include one or more images, video, audio, or some combination thereof. In some embodiments, audio is presented via an external device (e.g., speakers and/or headphones) that receives audio information from the VR headset 105, the VR console 110, or both, and presents audio data based on the audio information. An embodiment of the VR headset 105 is further described below in conjunction with FIG. 2. The VR headset 105 may comprise one or more rigid bodies, which may be rigidly or non-rigidly coupled to each other together. A rigid coupling between rigid bodies causes the coupled rigid bodies to act as a single rigid entity. In contrast, a non-rigid coupling between rigid bodies allows the rigid bodies to move relative to each other.

The VR headset 105 includes an electronic display 115, an optics block 118, one or more locators 120, one or more position sensors 125, and an inertial measurement unit (IMU) 130. The electronic display 115 displays images to the user in accordance with data received from the VR console 110. Example electronic display includes a liquid crystal display (LCD), an organic light emitting diode (OLED) display, an active-matrix organic light-emitting diode display (AMOLED), a transparent OLED, some other display, or some combination thereof.

The optics block 118 magnifies received light from the electronic display 115 and corrects optical errors associated with the image light. The corrected image light is presented to a user of the VR headset 105. An optical element may be an aperture, a Fresnel lens, a convex lens, a concave lens, a filter, or any other suitable optical element that affects the image light emitted from the electronic display 115. Moreover, the optics block 118 may include combinations of different optical elements. In some embodiments, one or more of the optical elements in the optics block 118 may have one or more coatings, such as anti-reflective coatings.

Magnification of the image light by the optics block 118 allows the electronic display 115 to be physically smaller, weigh less, and consume less power than larger displays. Additionally, magnification may increase a field of view of the displayed media. For example, the field of view of the displayed media is such that the displayed media is presented using almost all (e.g., 110 degrees diagonal), and in some cases all, of the user's field of view. In some embodiments, the optics block 118 is designed so its effective focal length is larger than the spacing to the electronic display 115, which magnifies the image light projected by the electronic display 115. Additionally, in some embodiments, the amount of magnification may be adjusted by adding or removing optical elements.

The optics block 118 may be designed to correct one or more types of optical error. Examples of optical error include: two dimensional optical errors, three dimensional optical errors, or some combination thereof. Two dimensional errors are optical aberrations that occur in two dimensions. Example types of two dimensional errors include: barrel distortion, pincushion distortion, longitudinal chromatic aberration, transverse chromatic aberration, or any other type of two-dimensional optical error. Three dimensional errors are optical errors that occur in three dimensions. Example types of three dimensional errors include spherical aberration, comatic aberration, field curvature, astigmatism, or any other type of three-dimensional optical error. In some embodiments, content provided to the electronic display 115 for display is pre-distorted, and the optics block 118 corrects the distortion when it receives image light from the electronic display 115 generated based on the content.

The locators 120 are objects located in specific positions on the VR headset 105 relative to one another and relative to a specific reference point on the VR headset 105. A locator 120 may be a light emitting diode (LED), a corner cube reflector, a reflective marker, a type of light source that contrasts with an environment in which the VR headset 105 operates, or some combination thereof. In embodiments where the locators 120 are active (i.e., an LED or other type of light emitting device), the locators 120 may emit light in the visible band (~380 nm to 750 nm), in the infrared (IR) band (~750 nm to 1 mm), in the ultraviolet band (10 nm to 380 nm), some other portion of the electromagnetic spectrum, or some combination thereof.

In some embodiments, the locators 120 are located beneath an outer surface of the VR headset 105, which is transparent to the wavelengths of light emitted or reflected by the locators 120 or is thin enough not to substantially attenuate the wavelengths of light emitted or reflected by the locators 120. Additionally, in some embodiments, the outer surface or other portions of the VR headset 105 are opaque in the visible band of wavelengths of light. Thus, the locators 120 may emit light in the IR band under an outer surface that is transparent in the IR band but opaque in the visible band.

The IMU 130 is an electronic device that generates fast calibration data based on measurement signals received from one or more of the position sensors 125. A position sensor 125 generates one or more measurement signals in response to motion of the VR headset 105. Examples of position sensors 125 include: one or more accelerometers, one or more gyroscopes, one or more magnetometers, another suitable type of sensor that detects motion, a type of sensor used for error correction of the IMU 130, or some combination thereof. The position sensors 125 may be located external to the IMU 130, internal to the IMU 130, or some combination thereof.

Based on the one or more measurement signals from one or more position sensors 125, the IMU 130 generates fast calibration data indicating an estimated position of the VR headset 105 relative to an initial position of the VR headset 105. For example, the position sensors 125 include multiple accelerometers to measure translational motion (forward/back, up/down, left/right) and multiple gyroscopes to measure rotational motion (e.g., pitch, yaw, roll). In some embodiments, the IMU 130 rapidly samples the measurement signals and calculates the estimated position of the VR headset 105 from the sampled data. For example, the IMU 130 integrates the measurement signals received from the accelerometers over time to estimate a velocity vector and integrates the velocity vector over time to determine an estimated position of a reference point on the VR headset 105. Alternatively, the IMU 130 provides the sampled measurement signals to the VR console 110, which determines the fast calibration data. The reference point is a point that may be used to describe the position of the VR headset 105. While the reference point may generally be defined as a point in space; however, in practice the reference point is defined as a point within the VR headset 105 (e.g., a center of the IMU 130).

The IMU 130 receives one or more calibration parameters from the VR console 110. As further discussed below, the one or more calibration parameters are used to maintain tracking of the VR headset 105. Based on a received calibration parameter, the IMU 130 may adjust one or more IMU parameters (e.g., sample rate). In some embodiments, certain calibration parameters cause the IMU 130 to update an initial position of the reference point so it corresponds to a next calibrated position of the reference point. Updating the initial position of the reference point as the next calibrated position of the reference point helps reduce accumulated error associated with the determined estimated position. The accumulated error, also referred to as drift error, causes the estimated position of the reference point to "drift" away from the actual position of the reference point over time.

The imaging device 135 generates slow calibration data in accordance with calibration parameters received from the VR console 110. Slow calibration data includes one or more images showing observed positions of the locators 120 that are detectable by the imaging device 135. The imaging device 135 may include one or more cameras, one or more video cameras, any other device capable of capturing images including one or more of the locators 120, or some combination thereof. Additionally, the imaging device 135 may include one or more filters (e.g., used to increase signal to noise ratio). The imaging device 135 is configured to detect light emitted or reflected from locators 120 in a field of view of the imaging device 135. In embodiments where the locators 120 include passive elements (e.g., a retroreflector), the imaging device 135 may include a light source that illuminates some or all of the locators 120, which retroreflect the light towards the light source in the imaging device 135. Slow calibration data is communicated from the imaging device 135 to the VR console 110, and the imaging device 135 receives one or more calibration parameters from the VR console 110 to adjust one or more imaging parameters (e.g., focal length, focus, frame rate, ISO, sensor temperature, shutter speed, aperture, etc.).

The VR input interface 140 is a device that allows a user to send action requests to the VR console 110. An action request is a request to perform a particular action. For example, an action request may be to start or end an application or to perform a particular action within the application. The VR input interface 140 may include one or more input devices. Example input devices include: a keyboard, a mouse, a game controller, or any other suitable device for receiving action requests and communicating the received action requests to the VR console 110. An action request received by the VR input interface 140 is communicated to the VR console 110, which performs an action corresponding to the action request. In some embodiments, the VR input interface 140 may provide haptic feedback to the user in accordance with instructions received from the VR console 110. For example, haptic feedback is provided when an action request is received, or the VR console 110 communicates instructions to the VR input interface 140 causing the VR input interface 140 to generate haptic feedback when the VR console 110 performs an action.

The VR console 110 provides media to the VR headset 105 for presentation to the user in accordance with information received from one or more of: the imaging device 135, the VR headset 105, and the VR input interface 140. In the example shown in FIG. 1, the VR console 110 includes an application store 145, a tracking module 150, and a virtual reality (VR) engine 155. Some embodiments of the VR console 110 have different modules than those described in conjunction with FIG. 1. Similarly, the functions further described below may be distributed among components of the VR console 110 in a different manner than is described here.

The application store 145 stores one or more applications for execution by the VR console 110. An application is a group of instructions, that when executed by a processor, generates content for presentation to the user. Content generated by an application may be in response to inputs received from the user via movement of the HR headset 105 or the VR input interface 140. Examples of applications include: gaming applications, conferencing applications, video playback application, or other suitable applications.

The tracking module 150 calibrates the VR system 100 using one or more calibration parameters and may adjust one or more calibration parameters to reduce error in determination of the position of the VR headset 105. For example, the tracking module 150 adjusts the focus of the imaging device 135 to obtain a more accurate position for observed locators on the VR headset 105. Moreover, calibration performed by the tracking module 150 also accounts for information received from the IMU 130. Additionally, if tracking of the VR headset 105 is lost (e.g., the imaging device 135 loses line of sight of at least a threshold number of the locators 120), the tracking module 150 re-calibrates some or all of the system environment 100.

The tracking module 150 tracks movements of the VR headset 105 using slow calibration information from the imaging device 135. The tracking module 150 determines positions of a reference point of the VR headset 105 using observed locators from the slow calibration information and a model of the VR headset 105. The tracking module 150 also determines positions of a reference point of the VR headset 105 using position information from the fast calibration information. Additionally, in some embodiments, the tracking module 150 may use portions of the fast calibration information, the slow calibration information, or some combination thereof, to predict a future location of the headset 105. The tracking module 150 provides the estimated or predicted future position of the VR headset 105 to the VR engine 155.

The VR engine 155 executes applications within the system environment 100 and receives position information, acceleration information, velocity information, predicted future positions, or some combination thereof of the VR headset 105 from the tracking module 150. Based on the received information, the VR engine 155 determines content to provide to the VR headset 105 for presentation to the user. For example, if the received information indicates that the user has looked to the left, the VR engine 155 generates content for the VR headset 105 that mirrors the user's movement in a virtual environment. Additionally, the VR engine 155 performs an action within an application executing on the VR console 110 in response to an action request received from the VR input interface 140 and provides feedback to the user that the action was performed. The provided feedback may be visual or audible feedback via the VR headset 105 or haptic feedback via the VR input interface 140.

Figure 2:
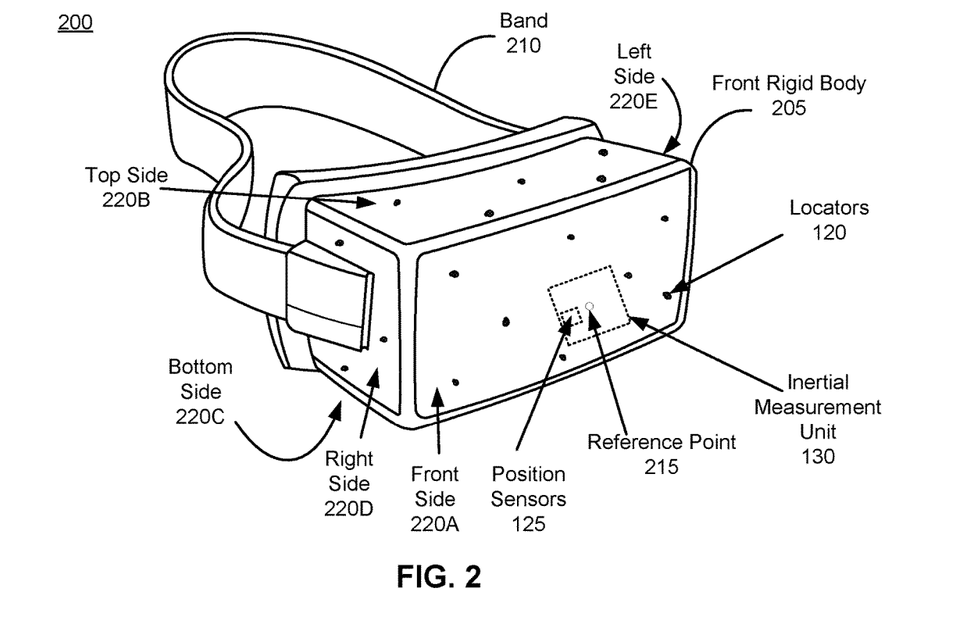
FIG. 2 is a diagram of a virtual reality headset, in accordance with an embodiment.

FIG. 2 is a diagram of a virtual reality (VR) headset, in accordance with an embodiment. The VR headset 200 is an embodiment of the VR headset 105, and includes a front rigid body 205 and a band 210. The front rigid body 205 is configured to be situated in front of user eyes, and the band 210 is configured to be stretched and to secure the front rigid body 205 on the user head.

In one embodiment, the front rigid body 205 is an apparatus on which an image is presented to a user. In the embodiment shown in FIG. 2, the front rigid body 205 includes a front side 220A, a top side 220B, a bottom side 220C, a right side 220D, and a left side 220E. The electronic display 115 is placed near the front rigid body 205. The remaining sides (e.g., the top side 220B, bottom side 220C, right side 220D and left side 220E) ensure enough distance between the electronic display 115 and eyes of the user for proper presentation of the image. In one embodiment, the sides 220 of the front rigid body 205 are opaque, such that a user wearing the VR headset 200 cannot see outside of the VR headset 200. In another embodiment, one or more of the sides 220 may be transparent.

In one embodiment, the front rigid body 205 further includes locators 120, an IMU 130, and position sensors 125 for tracking a movement of the VR headset 200. The IMU 130 generates, based on motions detected by the position sensors 125, fast calibration data which can be analyzed by the VR console 110 to determine the position of the VR headset 200, as described in detail with respect to FIG. 1. The locators 120 on various parts of the VR headset 200 are traced by the imaging device 135 at which slow calibration data is generated for the VR console 110 to identify the position of the VR headset 200, as described in detail with respect to FIG. 1.

In one embodiment, the IMU 130 is located on the front rigid body 205 for generating the fast calibration data responsive to the motion of the VR headset 200 detected through the position sensors 125. In one aspect, the IMU 130 is placed on the front side 220A of the front rigid body 205. Alternatively, the IMU 130 is located on any surface of the 220A of the front rigid body 205. In the embodiment illustrated in FIG. 2, the IMU 130 includes the position sensors 125. In other embodiments, the positions sensors 125 may not be included in the IMU 130, and may be placed on any side 220 of the VR headset 200.

The locators 120 are located in fixed positions on the front rigid body 205 relative to one another and relative to a reference point 215. In the example of FIG. 2, the reference point 215 is located at the center of the IMU 130. Locators 120, or portions of the locators 120, are located on a front side 220A, a top side 220B, a bottom side 220C, a right side 220D, and a left side 220E of the front rigid body 205 in the example of FIG. 2.

Figure 3:
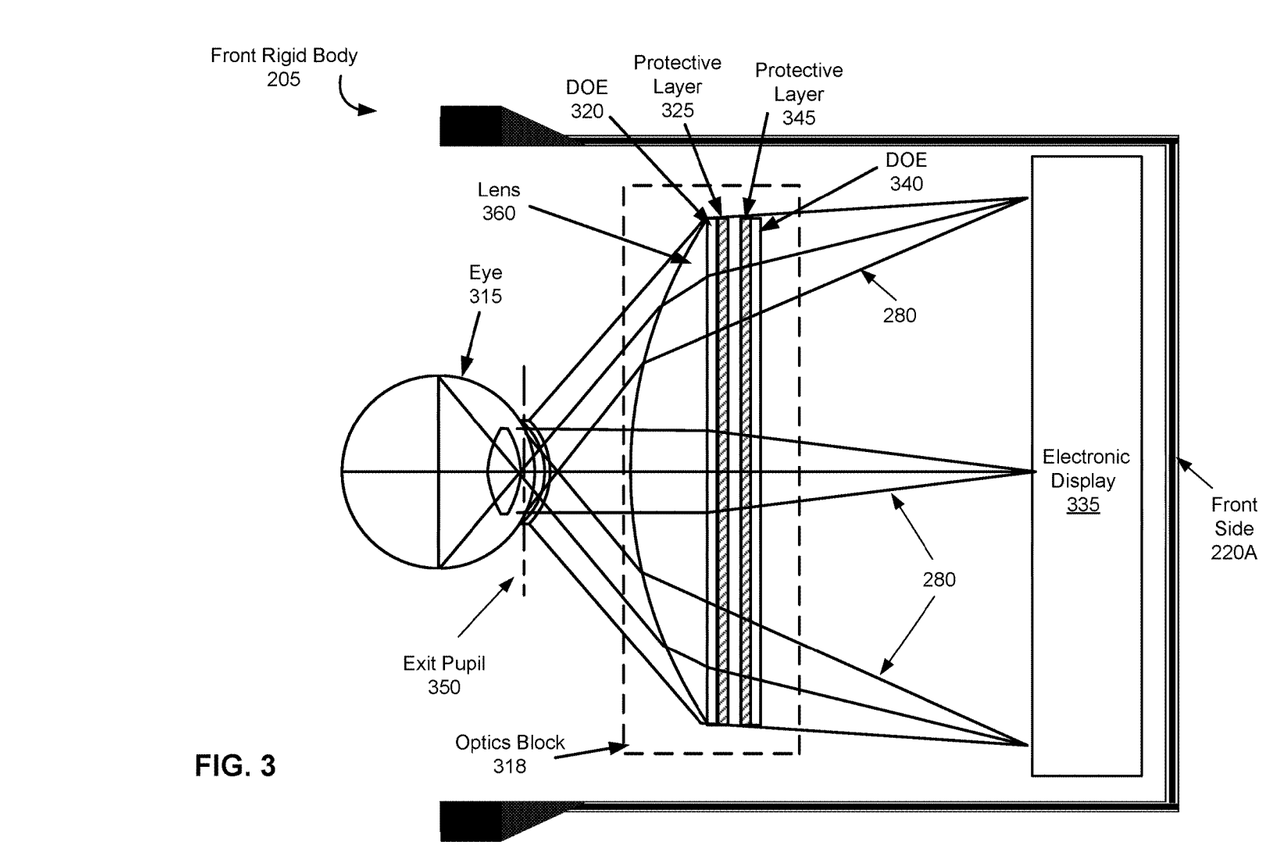
FIG. 3 is a cross section of a front rigid body of the VR headset in FIG. 2, in accordance with an embodiment.

FIG. 3 is a cross section of the front rigid body 205 of the embodiment of a VR headset 200 shown in FIG. 2. As shown in FIG. 3, an electronic display 335 and an optics block 318 are located inside the front rigid body 205. In one embodiment, the electronic display 335 is, e.g., the electronic display 115 of FIG. 1, and the optics block 318 is e.g., the optics block 118 of FIG. 1. The electronic display 335 is placed near the front side 220A of the front rigid body 205 facing an exit pupil 350, and transmits light toward the optics block 318. The optics block 318 alters image light transmitted from the electronic display 335, and provides the altered image light to an exit pupil 350. The exit pupil 350 is the location of the front rigid body 205, where a user's eye 245 is positioned. Hence, light generated from the electronic display 335 propagates to the exit pupil 350 through the optics block 118, for example, via the rays 280. For purposes of illustration, FIG. 3 shows a cross section associated with a single eye 245, but another optics block, separate from the optics block 318, provides altered image light to another eye of the user.

The optics block 318 is a component that alters light received from the electronic display 335 and directs the altered light to the exit pupil 350. In one embodiment, the optics block 318 includes diffractive optical elements (DOEs) 320 and 340, protective layers 325 and 345, and a lens 360. In one aspect, a first surface of the DOE 340 faces the electronic display 335, and the protective layer 345 is coupled to a second surface of the DOE 340 facing away from the first surface of the DOE 340. Moreover, the protective layer 325 is coupled to a first surface of the DOE 320 facing the DOE 340, and the lens 360 is coupled to a second surface of the DOE 320 facing away from the first surface of the DOE 320. The space between the protective layers 325 and 345 may be vacuum or filled with air, gas, or plastics having a certain refractive index to control diffractions of light for different wavelengths. In this structure, light transmitted from the electronic display 335 propagates through the DOE 340, protective layer 345, the protective layer 325, the DOE 320, and the lens 360 to the exit pupil 350, in that sequence. Together, these components of the optics block 318 direct the image light to the exit pupil 350 for presentation to the user. In one embodiment, the image light directed to the user may be magnified, and in some embodiments, also corrected for one or more additional optical errors (e.g., spherical aberration, coma, astigmatism, field curvature, distortion are third order aberrations, etc.) through the optics block 318.

The DOEs 320 and 340 are formed between the exit pupil 350 and the electronic display 335, and together form a multi-layer DOE structure. In one example, the DOEs 320 and 340 are made of plastics (e.g., PMMA, polycarbonate, E48R, etc.). When only one DOE is implemented in the optics block 318, optical aberration such as chromatic, spherical, coma, astigmatism, field curvature and distortion may occur. By implementing two DOEs 320 and 340, optical aberration may be reduced.

The protective layers 325 and 345 are formed between the DOEs 320 and 340. In one example, the protective layers 325 and 345 are made of resin, or epoxy. By implementing the protective layers 325 and 345 between the DOEs 320 and 340, the protective layers 325 and 345 protect respective DOEs 320 and 340. Additionally, the protective layers 325 and 345 provide an extra degree-of-freedom to compensate for the diffraction efficiency variation due to wavelengths and incident angles. Accordingly, scattering and diffraction due to the two DOEs 320 and 340 can be reduced by implementing the protective layers 325 and 345.

The lens 360 is a component coupled to another surface of the DOE 320 facing the exit pupil 350 for directing the light toward the exit pupil 350. In one aspect, a surface of the lens 360 coupled to the second surface of the DOE 320 is relatively flat, whereas another surface of the lens 360 toward the exit pupil 350 is convex. In other embodiments, the lens 360 may have a different shape, or may be omitted.

Figure 4:
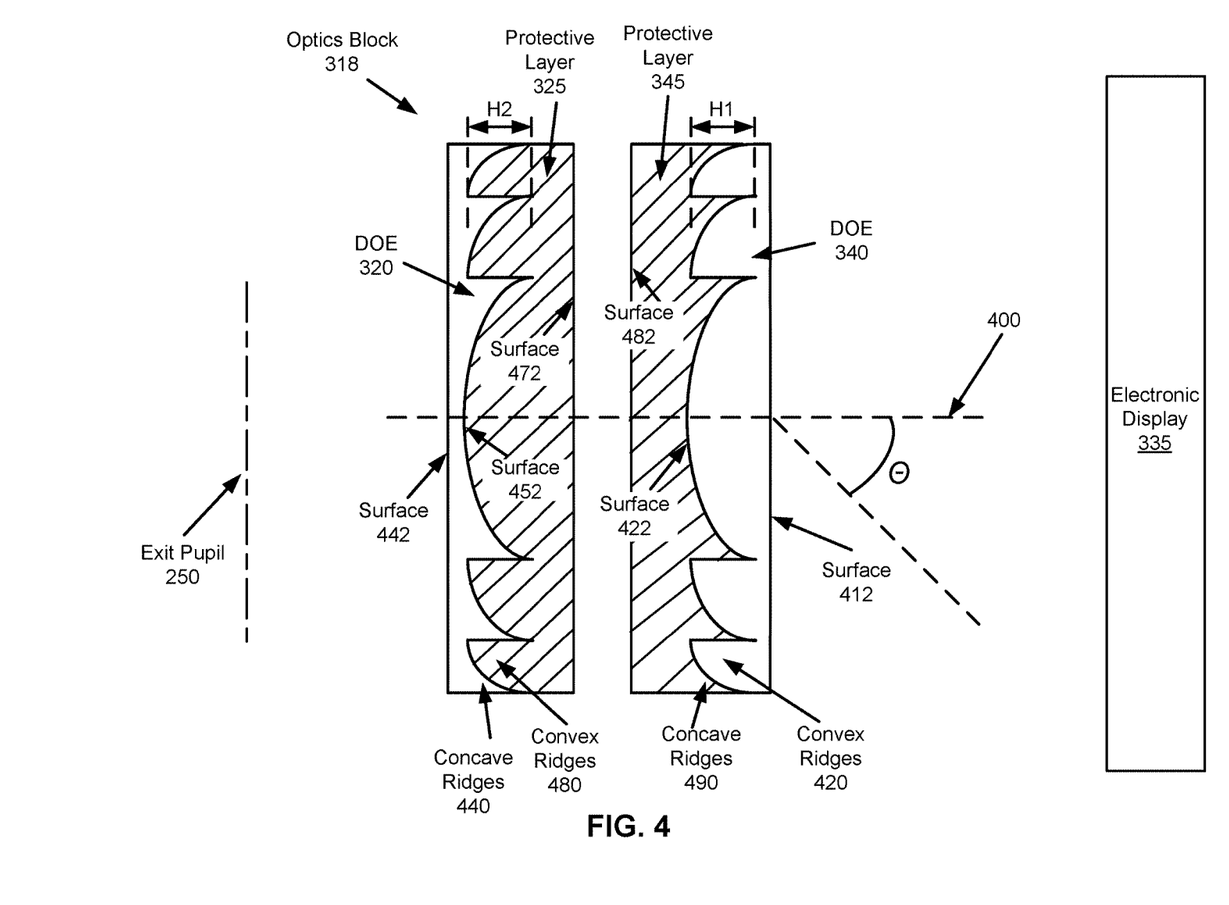
FIG. 4 is an enlarged diagram of the optics block 318 of FIG. 3, according to an embodiment.

FIG. 4 is an expanded diagram of the optics block 318 of FIG. 3, according to one embodiment. In the embodiment shown in FIG. 4, each of the DOEs 320 and 340 has a plurality of ridges, and each of the protective layers 325 and 345 fills the spaces between ridges on a respective DOE. In one aspect, the protective layers 325 and 345 include materials having a different refractive index than the refractive indexes of the DOEs 320 and 340.

The DOEs 320 and 340 have a plurality of ridges to improve diffraction efficiency, thereby allowing the thickness and weight of the DOEs 320 and 340 to be reduced. In one aspect, the DOE 340 has a first surface 412 toward the electronic display 335 and a second surface 422 toward the DOE 320 (or the exit pupil 350). In addition, the DOE 320 has a first surface 452 toward the DOE 340 (or the electronic display 335) and the second surface 442 toward the exit pupil 350. In one embodiment, the first surface 412 of the DOE 340 is a flat surface, and the second surface 422 of the DOE 340 includes half convex ridges 420, where a flat portion of each of the half convex ridges 420 in parallel with a center line 400 of the optics block 318 faces the center line 400. The center line 400 is perpendicular to the electronic display 335 and the exit pupil 250, and is located in a center of the optics block 318. Moreover, the second surface 442 of the DOE 320 is a flat surface, and the first surface 452 of the DOE 320 includes half concave ridges 440, where a flat portion of each of the half concave ridges 440 in parallel with the center line 400 of the optics block 318 faces away from the center line 400. In one aspect, each of the half convex ridges 420 has a substantially uniform height H1 and each of the half concave ridges 440 has a substantially uniform height H2. A height of ridges herein refers to a maximum distance between one end of one of the ridges and another end of the one of the ridges along the center line 400. Preferably, the heights H1 and H2 are equal, where the shapes of the half convex ridges 420 and the half concave ridges 440 correspond with each other. In other embodiments, the shapes of the half convex ridges 420 and the half concave ridges 440 may not correspond with each other, or the heights H1 and H2 may be different.

The protective layer 345 covers the second surface 422 of the DOE 340 and the protective layer 325 covers the first surface 452 of the DOE 320. In this embodiment, the height of the protective layers 345 and 325 along the center line 400 are greater than the heights H1 and H2 of the ridges 420 and 440, respectively. Thus, the protective layer 345 includes half concave ridges 490 that fill the spaces between the half convex ridges 420, and the protective layer 325 includes half convex ridges 480 that fill the spaces between the half concave ridges 440. In one embodiment, shapes of the half concave ridges 490 of the protective layer 345 are substantially similar to shapes of respective half concave ridges 440 of the DOE 320; and similarly, shapes of the half convex ridges 480 of the protective layer 325 are substantially similar to shapes of respective half convex ridges 420 of the DOE 340. In one implementation, a surface 482 of the protective layer 345 away from the half concave ridges 490, and a surface 472 of the protective layer 325 away from the half concave ridges 490 are flat. In another implementation, the surface 482 and 472 may be concave, convex, or a combination of both.

In one aspect, the protective layers 325 and 345 include a material with refractive index different from the refractive index of the DOEs 320 and 340. The refractive index of the protective layers 325 and 345 can be chosen such that a diffraction efficiency can be maximized. Specifically, the diffraction efficiency $\eta_m$ can be defined as Equation 1 below:

$$\eta_m = \left|\frac{\sin[\pi(m-\phi)]}{\pi(m-\phi)}\right|^2 \quad \text{(Equation 1)}$$

where $\phi$ is the optical path difference (OPD), in units of wavelengths, traversing the optics block 318, and m is a diffraction order. The optical path difference $\phi$ can be further expressed as equation 2 below:

$$\phi = \frac{H_1\left[\sqrt{n_m^2(\lambda) - n_1^2(\lambda)\sin^2(\theta)} - n_1(\lambda)\cos(\theta)\right]}{\lambda} - \frac{H_2\left[\sqrt{n_2^2(\lambda) - n_1^2(\lambda)\sin^2(\theta)} - \sqrt{n_m^2(\lambda) - n_1^2(\lambda)\sin^2(\theta)}\right]}{\lambda} \quad \text{(Equation 2)}$$

where $\lambda$ is the wavelength of light; $\theta$ is an incident angle (e.g., an angle between entering light and the center line 400 of FIG. 4); $n_1$ is a refractive index of the DOE 340; $n_2$ is a refractive index of the DOE 320; and $n_3$ is a refractive index of the protective layers 325 and 345. Preferably, the optics blocks 318 is transparent in a wavelength range between 400 nm to 700 nm. In one example, the optics blocks 318 can be transparent up to a wavelength of 900 nm for an eye tracking application. To maximize the diffraction efficiency $\eta_m$ that is insensitive to the wavelength $\lambda$ and the incident angle $\theta$, following conditions can be satisfied.

$$\phi = m, \; \frac{\partial \eta_m}{\partial \lambda} = 0, \; \frac{\partial \eta_m}{\partial \theta} = 0 \quad \text{(Equation 3)}$$

In one example, a refractive index of the protective layers 325, 345 is between 1.4 and 1.72 at a wavelength of 588 nm, and a refractive index of the DOEs 320 and 340 is 1.4 and 1.72 at a wavelength of 588 nm. Preferably, the refractive indexes of the protective layers 325 and 345 are the same and the refractive indexes of the DOEs 320 and 340 are the same. Alternatively, the refractive indexes of the protective layers and DOEs can be different with each other to improve diffractive efficiency.

Additional Configuration Information

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

The language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A display headset comprising:
   an electronic display configured to emit image light in a first direction toward an exit pupil corresponding to a location of an eye of a user; and
   an optics block configured to direct the image light from the electronic display to the exit pupil, the optics block comprising:
   a first diffractive optical element between the exit pupil and the electronic display having a first diffractive surface facing away from the electronic display;
   a second diffractive optical element positioned between the first diffractive optical element and the exit pupil, and having a second diffractive surface facing the first diffractive surface and away from the exit pupil;
   a first protective layer to protect the first diffractive optical element, disposed on and covering the first diffractive surface of the first diffractive optical element facing the second diffractive optical element; and
   a second protective layer to protect the second diffractive optical element, disposed on and covering the second diffractive surface of the second diffractive optical element facing the first diffractive optical element, the first protective layer and the second protective layer to compensate for a variation in a diffraction efficiency at different wavelengths and incident angles of the image light, and wherein each of the first diffractive optical element, the second diffractive optical element, the first protective layer, and the second protective layer at least partially overlap with each other along a second direction substantially parallel to the electronic display, and intersect with center line that is substantially perpendicular to a surface of the electronic display extending from the surface of the electronic display to the exit pupil, such that the image light emitted from the electronic display travels through the components of the optics block in the order of the first diffractive optical element, the first protective layer, the second protective layer, and the second diffractive optical element to reach the exit pupil.

2. The display headset of claim 1, wherein the first protective layer and the second protective layer comprise resin.

3. The display headset of claim 2, wherein the first protective layer is transparent in a wavelength range between 400 nm to 700 nm.

4. The display headset of claim 1, wherein the first diffractive surface of the first diffractive optical element comprises first ridges, and the second diffractive surface of the second diffractive optical element comprises second ridges, each of the first ridges corresponding to a respective one of the second ridges, wherein the first protective layer comprises third ridges substantially similar to the second ridges of the second diffractive optical element, and wherein the second protective layer comprises fourth ridges substantially similar to the first ridges of the first diffractive optical element.

5. The display headset of claim 4, wherein a refractive index of the first protective layer and the second protective layer is between 1.4 and 1.72, wherein a refractive index of the first diffractive optical element is between 1.4 and 1.72, and wherein a refractive index of the second diffractive optical element is between 1.4 and 1.72.

6. The display headset of claim 1, wherein the first protective layer and the second protective layer comprise a same material.

7. The display headset of claim 1, wherein the first diffractive surface of the first diffractive optical element comprises a first plurality of ridges.

8. The display headset of claim 7, wherein the second diffractive surface of the second diffractive optical element comprises a second plurality of ridges.

9. The display headset of claim 8, wherein the first diffractive surface of the first diffractive optical element that includes the first plurality of ridges faces toward the exit pupil, and the second diffractive surface of the second diffractive optical element that includes the second plurality of ridges faces toward the electronic display.

10. The display headset of claim 9, wherein the first plurality of ridges are half convex ridges and wherein the second plurality of ridges are half concave ridges.

11. The display headset of claim 10, further comprising:
a lens coupled to a surface of the second diffractive optical element opposite the second diffractive surface, a surface of the lens disposed away from the surface of the second diffractive optical element being convex.

12. The display headset of claim 8, wherein the first plurality of ridges comprises a plurality of convex ridges, each of the convex ridges of the first plurality of ridges corresponding to a concave ridge of the second plurality of ridges.

13. The display headset of claim of claim 12, wherein a shape of each of the plurality of convex ridges of the first plurality of ridges corresponds to a shape of its corresponding concave ridge of the second plurality of ridges.

14. The display headset of claim of claim 12, wherein the convex ridges are half convex ridges, and the concave ridges are half concave ridges.

15. The display headset of claim of claim 1, wherein the first protective layer and the second protective layer are spaced apart from each other.

* * * * *

UNITED STATES PATENT AND TRADEMARK OFFICE
CERTIFICATE OF CORRECTION

PATENT NO. : 10,209,412 B2
APPLICATION NO. : 14/968805
DATED : February 19, 2019
INVENTOR(S) : Ning Yeung Chan et al.

Page 1 of 1

It is certified that error appears in the above-identified patent and that said Letters Patent is hereby corrected as shown below:

In the Claims

Column 12, Line 28, Claim 13, delete "of claim of claim" and insert -- of claim --.

Column 12, Line 32, Claim 14, delete "of claim of claim" and insert -- of claim --.

Column 12, Line 35, Claim 15, delete "of claim of claim" and insert -- of claim --.

Signed and Sealed this
Sixteenth Day of July, 2019

Andrei Iancu
*Director of the United States Patent and Trademark Office*